United States Patent
Vollmer et al.

(10) Patent No.: US 7,277,737 B1
(45) Date of Patent: Oct. 2, 2007

(54) METHOD FOR POWER-SAVING OPERATION OF COMMUNICATION TERMINALS IN A COMMUNICATION SYSTEM IN ESPECIALLY IN A WIRELESS COMMUNICATION SYSTEMS

(75) Inventors: Vasco Vollmer, Gartow (DE); Markus Radimirsch, Laatzen (DE); Guenter Seidel, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/831,814

(22) PCT Filed: Sep. 10, 1999

(86) PCT No.: PCT/DE99/02870

§ 371 (c)(1),
(2), (4) Date: Aug. 16, 2001

(87) PCT Pub. No.: WO00/30328

PCT Pub. Date: May 25, 2000

(30) Foreign Application Priority Data

Nov. 13, 1998 (DE) .................... 198 52 260
Dec. 30, 1998 (DE) .................... 198 60 868

(51) Int. Cl.
*H04M 1/00* (2006.01)
*H04M 1/38* (2006.01)
*H04M 7/00* (2006.01)

(52) U.S. Cl. .................... 455/574; 455/572; 455/500
(58) Field of Classification Search ................ 455/574, 455/450–455, 502, 507, 509, 343.1, 343.2, 455/208, 265, 522, 572, 500
See application file for complete search history.

(56) References Cited

U.S. PATENT DOCUMENTS

| | | | | |
|---|---|---|---|---|
| 5,517,504 A | * | 5/1996 | Tran et al. | 370/95.3 |
| 5,606,313 A | * | 2/1997 | Allen et al. | 340/10.31 |
| 5,627,882 A | * | 5/1997 | Chien et al. | 455/464 |
| 5,794,137 A | * | 8/1998 | Harte | 455/343 |
| 5,991,635 A | * | 11/1999 | Dent et al. | 455/517 |

(Continued)

FOREIGN PATENT DOCUMENTS

DE 197 26 120 12/1998

(Continued)

OTHER PUBLICATIONS

Bruninghaus, K. et al., "Coarse frame synchronisation for OFDM based wireless communication systems", IEEE International Symposium on Personal, Indoor and Mobile Radio Communications, vol. 2, No. 2, Sep. 8, 1998, pp. 806-810.

(Continued)

*Primary Examiner*—William J. Deane, Jr.
(74) *Attorney, Agent, or Firm*—Kenyon & Kenyon LLP

(57) ABSTRACT

In a method of power saving operation of communication terminals in a communication system, at least two operating modes are defined: active and sleep plus optionally standby. Announcements sent out from a master station over an announcement channel are monitored within fixed time windows and thereafter the operating modes of the terminals are controlled. Synchronization information/frame symbols from the master station are also analyzed in the sleep phases and in the standby phases.

32 Claims, 11 Drawing Sheets

U.S. PATENT DOCUMENTS

| | | | |
|---|---|---|---|
| 6,069,929 A * | 5/2000 | Yabe et al. | 375/368 |
| 6,072,784 A * | 6/2000 | Agrawal et al. | 370/311 |
| 6,078,819 A * | 6/2000 | Ciccone et al. | 455/463 |
| 6,192,026 B1 * | 2/2001 | Pollack et al. | 370/203 |
| 6,229,988 B1 * | 5/2001 | Stapefeld et al. | 455/38.3 |
| 6,236,674 B1 * | 5/2001 | Morelli et al. | 375/219 |
| 6,289,228 B1 * | 9/2001 | Rotstein et al. | 455/574 |
| 6,292,508 B1 * | 9/2001 | Hong et al. | 375/134 |
| 6,356,538 B1 * | 3/2002 | Li | 370/311 |
| 6,434,119 B1 * | 8/2002 | Wiese et al. | 370/252 |
| 6,445,730 B1 * | 9/2002 | Greszczuk et al. | 375/219 |
| 6,480,476 B1 * | 11/2002 | Willars | 370/311 |
| 6,804,503 B2 * | 10/2004 | Shohara et al. | 455/343.3 |
| 6,879,579 B1 * | 4/2005 | Myles et al. | 370/348 |
| 2001/0034233 A1 * | 10/2001 | Tiedemann, Jr. et al. | |
| 2005/0020321 A1 * | 1/2005 | Rotzoll | |

FOREIGN PATENT DOCUMENTS

| | | |
|---|---|---|
| EP | 0 473 465 | 3/1992 |
| EP | 0 726 508 | 8/1996 |
| GB | 2 320 398 | 6/1998 |

OTHER PUBLICATIONS

D. Petras, A. Krämling, "MAC protocol with polling and fast collision resolution for an ATM air interface", IEEE ATM Workshop, San Fransisco, CA, Aug. 1996.

D. Petras, A. Krämling, A. Hettich, "MAC protocol for wireless ATM: contention free versus contention based transmission of reservation requests" IEEE International Symposium on Personal, Indoor and Mobile Radio Communications, Taipei, Taiwan, Oct. 1996.

* cited by examiner

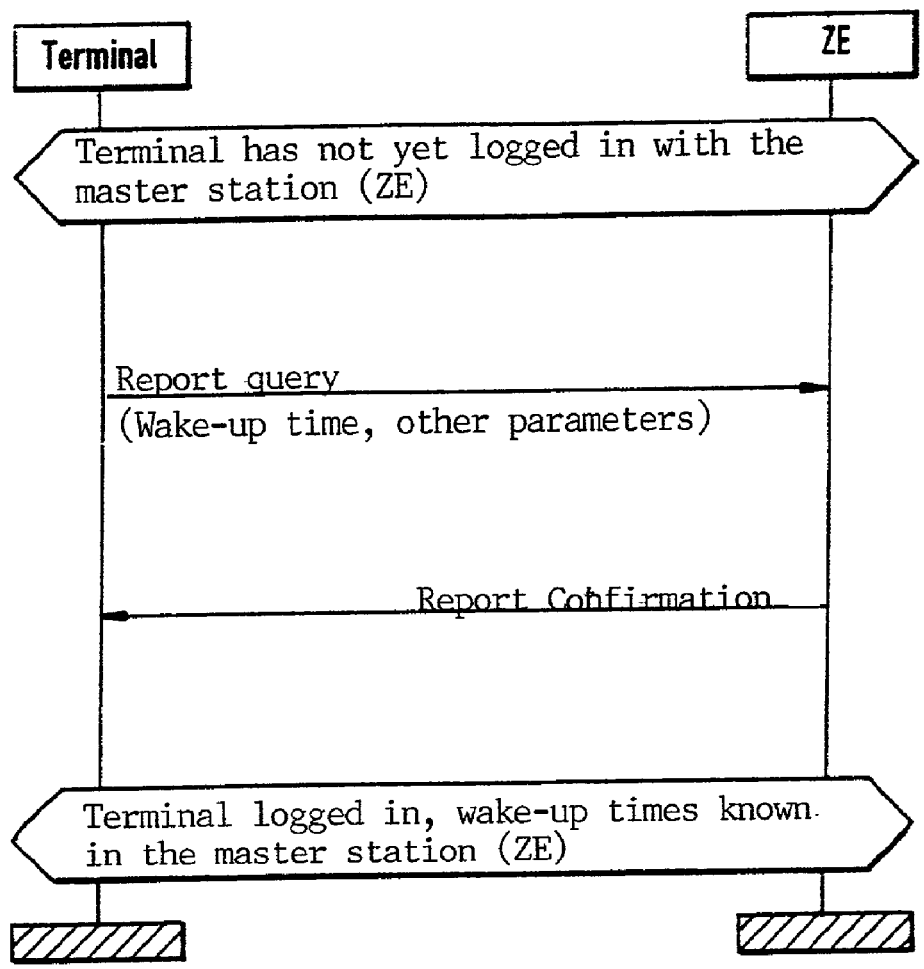
Fig. 16
Fig. 17
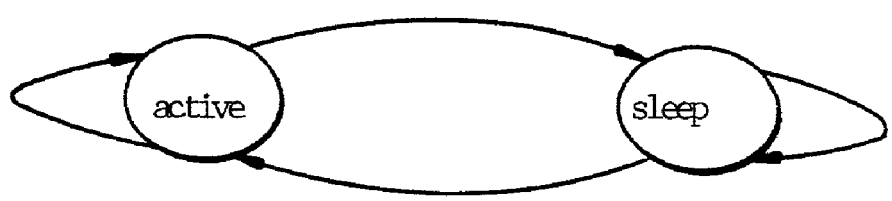

| Frame 1 | Frame 2 | Frame 3 | Frame 4 | Frame 5 | Frame 6 | Frame 7 | Frame 8 |
| T1 active | T1 sleeps | T1 sleeps | T1 active | T1 sleeps | T1 sleeps | T1 active | T1 sleeps |

METHOD FOR POWER-SAVING OPERATION OF COMMUNICATION TERMINALS IN A COMMUNICATION SYSTEM IN ESPECIALLY IN A WIRELESS COMMUNICATION SYSTEMS

FIELD OF THE INVENTION

The present invention is based on a method of power-saving operation of communication terminals in a communication system, in particular a wireless communication system having packet switching.

BACKGROUND INFORMATION

A common transmission channel is used for transmission of fixed-length packets between terminals or in combination with a master station which may itself be a terminal. This transmission channel makes available a transmission capacity between terminals and the master station (uplink) and between the master station and the terminals (downlink). A method of implementing such a packet transmission has been proposed in German Patent Application No. 197 26 120.

Possible media include a wireless channel, a passive optical network, or cable distribution networks using coaxial cables and/or glass fibers. FIG. 1 illustrates the principle. Instead of a terminal, a concentrator having a plurality of terminals may also be used (an extension unit in the possession of a subscriber or a network unit in the possession of the network operator). When a terminal is mentioned below, no restriction on generality is intended. Subscribers and their terminals are labeled as 1, the common transmission medium as 2, the master station as 3 and the transmission network as 4. In known circuit-switched systems, e.g., an analog telephone or ISDN, each terminal has its own connection to a network node, and these connections may be bundled on one line or a few lines (see FIG. 2). The same thing also applies to terminals in ATM systems (ATM=asynchronous transfer mode). In the case of an ATM, such a network node 5 is an ATM multiplexer.

The main medium to be considered here is a wireless channel. Not being tied to one location, these terminals are usually notebooks or other portable devices that can be operated with batteries. Therefore, power consumption is an important sales argument for such devices.

The following embodiments have been developed for use in ATM networks, but they can very easily also be used in other networks, such as IP (Internet protocol) networks or Ethernet networks.

It is important for the network nodes to guarantee support of service goods. Since packets of different connections must be transmitted reliably at different rates, operating strategies must be introduced. To implement such an operating strategy, use of the common medium must be coordinated, but this can be accomplished only by using a master station. Such media access controls (MAC) are known (See D. Petras, A. Krämling, "MAC protocol with polling and fast collision resolution for an ATM air interface" IEEE ATM Workshop, San Francisco, Calif., Aug. 25, 1996, and D. Petras, A. Krämling, A. Hettich, "MAC protocol for wireless ATM: contention free versus contention based transmission of reservation requests" PIMRC '96, Teipei, Taiwan, October 1996, for example).

Power saving methods are used in GSM. These methods can be used very easily because GSM supplies circuit-switched communication. In other words, the only modes are "connected" and "not connected." In the "connected" mode, data is exchanged continuously between the network and subscriber. In the "not connected" mode, the terminal must be notified at regular intervals about which base station is currently the best to receive and whether a call is arriving for a terminal.

Incoming calls are sent out by all the base stations in the roaming area—this is known as paging—and the terminal logs on with the best base station for receiving the call at the moment. The terminal does not log on until it leaves the roaming area. In this case, it must log on in the new roaming area.

There is also a power saving mode in HIPERLAN type 1 systems. Packets of variable length are also exchanged in this method. However, the MAC protocol is organized decentrally and each subscriber attempts to occupy a channel in competition with other subscribers, as in the Ethernet MAC protocol. The MAC is connectionless, so that a packet can always be expected. The address of the receiver and the length of the packet are sent at the beginning of each packet, so that each subscriber must monitor each of these packet headers at least. If the subscriber finds that the packet is not intended for it, it can go to sleep for the duration of the packet that can be derived from the header. This is relatively inefficient because longer sleep phases are not possible. In addition, the channel must always be monitored (at least the power level), even if there is currently no traffic.

European Published Patent Application No. 0 473 465 describes an arrangement for power saving operation of a mobile communication terminal. This arrangement contains a microprocessor which is used to decode messages of a paging channel and to determine whether the message is relevant for that terminal. If the message is not intended for this terminal, the terminal goes into a power saving mode between reception of the messages on the paging channel, where first a timer is started and generates a signal after a predetermined period of time has elapsed, whereupon the microprocessor goes into an active mode and receives the message on the paging channel. The base station sends a synchronization sequence for detecting the paging message and for resynchronization.

The arrangement according to European Published Patent Application No. 0 473 465 includes a decision circuit by means of which the synchronization of the terminal can be controlled with respect to the synchronization information/frame symbols received by a master station. The decision circuit occupies the controller of the terminal when the terminal goes from an active first operating mode into another operating mode, i.e., a second or third operating mode, e.g., a standby or sleep phase. Also provided is a timer, which is controlled by the decision circuit and which opens a timing window for receiving the synchronization information/frame symbols, when such information/frame symbols are to be expected, it being possible to use received synchronization information to correct the time basis of the terminal.

SUMMARY OF THE INVENTION

Since communication between terminals or between terminals and the master station takes place in particular as a packet switching process, power saving methods can also be used with existing connections. Due to the master station, it is also possible for a terminal to log on with the master station how it will go to sleep and when it will log on again.

The present invention relates to power-saving methods that can be used in systems with centrally controlled MAC.

It attempts to maximally utilize the properties of the MAC protocol and achieve the longest possible times during which the activity of the terminals can be limited to a minimum. It makes use of the fact that different power consuming system components can be turned on and off very quickly, while other parts need more time to be ready to run again.

The present invention also solves the problem of synchronization between terminal and master station. Because of clock inaccuracy, it may happen that the time reference of a terminal is not synchronized with the master station.

Therefore, the two must be synchronized in a way that does not consume much power.

The present invention is a very flexible method of conserving power, in particular due to the fact that the period of time after which a terminal logs on again can be negotiated freely between the master station and the terminal.

This period of time depends on the sum of the traffic parameters of all connections. If there are many open connections having high requirements regarding packet delay, these periods of time may also be very short. If there are only a few connections having low requirements regarding packet delay, then long sleep times are possible.

The operating standby of the terminals can be optimized without consuming much power due to the introduction of different levels of sleep modes, which are defined so that the average operating times of different system components can be utilized efficiently.

Simple and reliable data transmission can be achieved in a communication system due to the synchronization between the terminals and the master station. Known methods cannot easily be implemented reliably because of the non-deterministic structure of the MAC protocol or because they require broadband reception of the signal from the master station.

Announcements for sending and receiving are only sent from the master station to a terminal over a common announcement channel. Therefore, because of the fundamental structure of the MAC protocol, a terminal can become active only for very limited periods of time to receive the required information. Since signal processing is very complicated in the case of reception, power consumption is not negligible in this case. This portion of the power consumption is minimized in the present invention due to the fact that the periods of time between individual reception operations are lengthened.

BRIEF DESCRIPTION OF THE DRAWINGS

FIG. 16 shows the transfer of wake-up times during association.

FIG. 17 shows another second function state diagram for conserving power.

DETAILED DESCRIPTION

Figure 1:
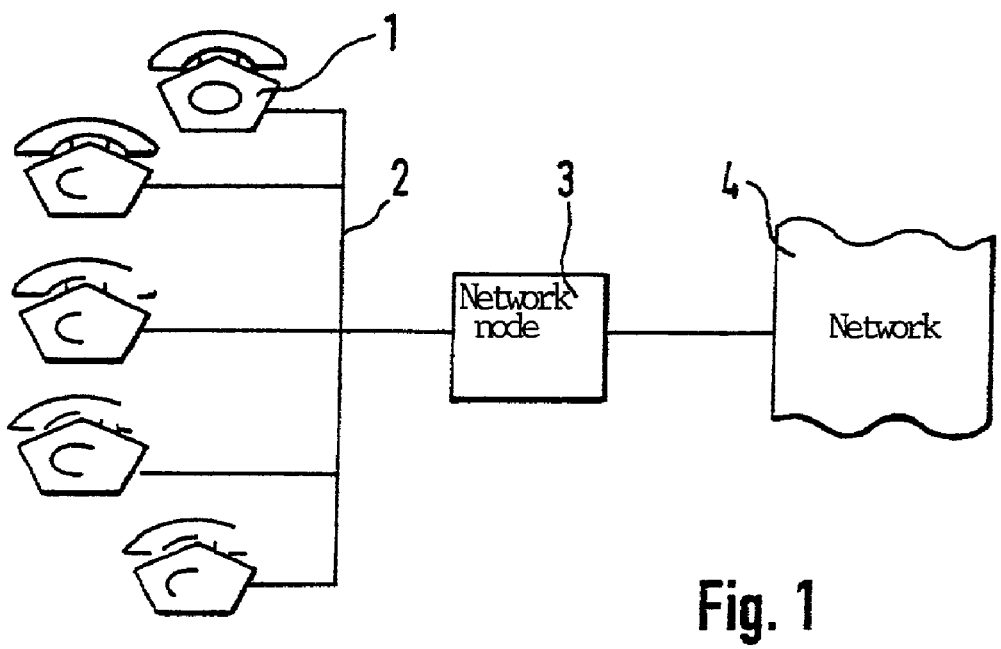
FIG. 1 shows a first arrangement of terminals connected to a network via a master station.
Figure 2:
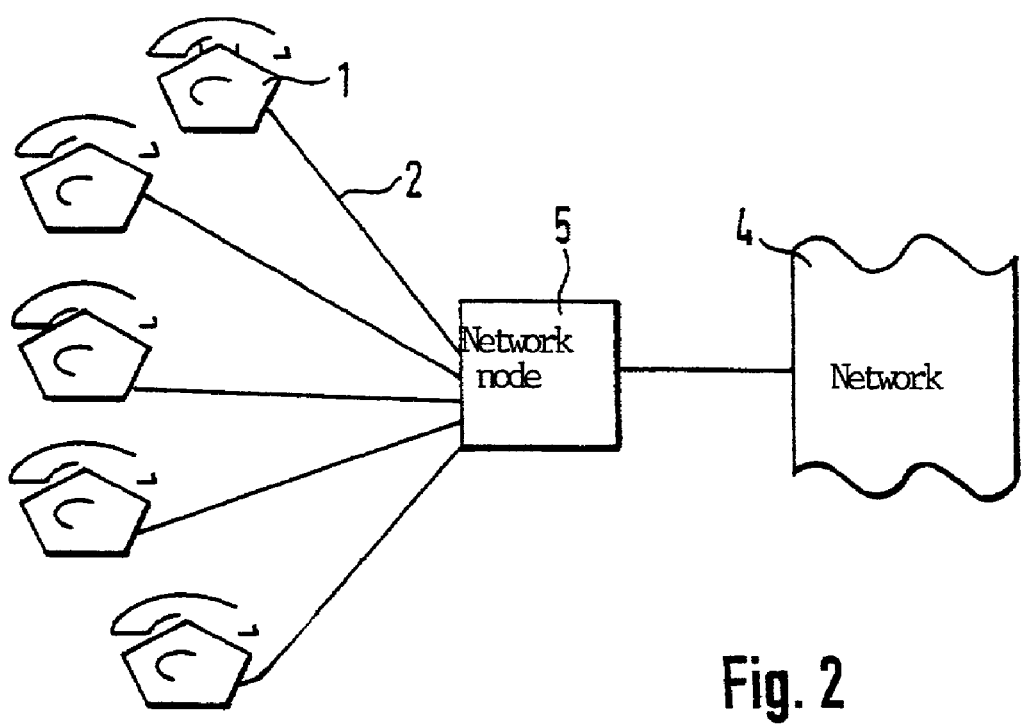
FIG. 2 shows a second arrangement of terminals connected to a network via a master station.
Figure 3:
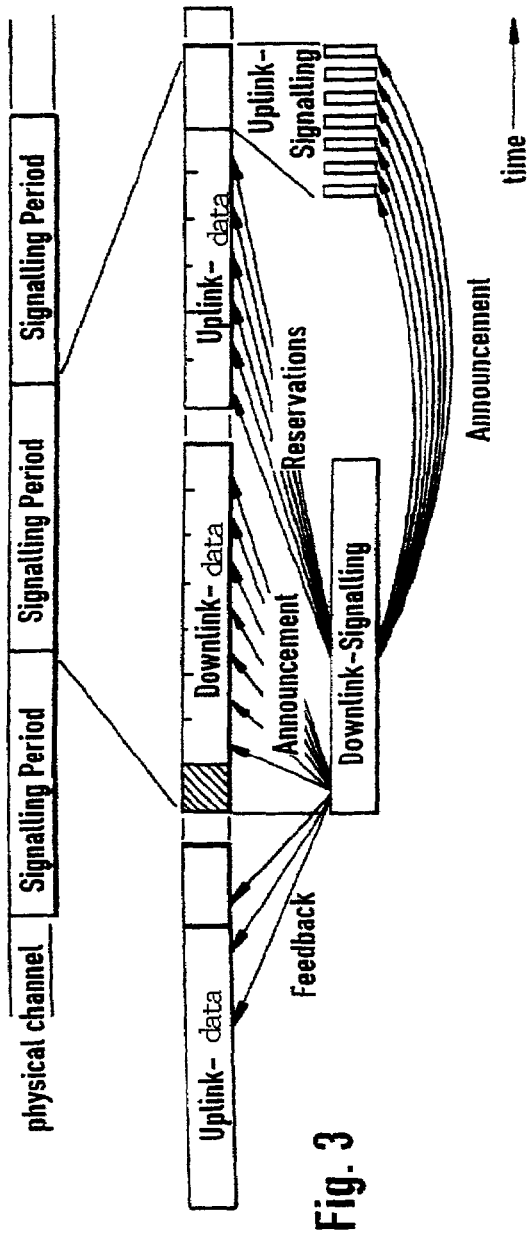
FIG. 3 shows the basic structure of a transmission frame on which the present invention is based.

Before discussing the actual method according to the present invention, first the transmission frame shown in FIG. 3, on which the present invention is based, will be described. The basic principle of the DSA (Dynamic Slot Assignment) protocol is described in detail in German Patent Application No. P 197 26 120.5. The method described here can be used for FDD (Frequency Division Duplex) systems as well as TDD (Time Division Duplex) systems. It is assumed below without restricting the general scope of the present invention that transmission is by the TDD (Time Division Duplex) system. The physical channel is divided into time slots, each holding one data burst. Such a data burst contains an ATM cell including the required overhead for a training sequence, synchronization, forward error correction FEC, and protection times. In the downlink signaling burst, the master station allocates to each terminal a certain transmission capacity in the form of time slots for a specific interval of time, called SP (signaling period), as a function of the transmission resource requirements of terminals T1, T2, etc. The total number of slots of an SP is variable and varies over time.

An uplink phase includes a plurality of bursts transmitted by the terminals, and an uplink signaling phase. During the uplink signaling phase, the terminals are authorized to send signaling messages to the master station if they have not been allocated any reserved time slots for the transfer within the normal bursts (pgback method). Polling or random access can be used for uplink signaling. In the downlink phase, the signaling PDU (Protocol Data Unit) and all the bursts are sent from the master station to the terminals. All the necessary information for the next SP including the signaling slots is transmitted to the terminals within a signaling PDU. In addition, the signaling PDU contains feedback messages for the uplink signaling information sent previously, which is necessary for resolution of a collision or functions such as automatic repeat request (ARQ). With this information, the terminals know when they can send and receive bursts. If different types of bursts, e.g., long or short, are used, the type of burst is announced by the master station within the signaling PDU.

The downlink signaling here is the central element of consideration. It is referred to below as an announcement channel (AC). Another important element is uplink signaling, which mostly involves requests from terminals to the master station. This element is referred to below as return channel RC.

The method according to the present invention operates on the basis of connections, i.e., it is always necessary to establish at least one connection over which communication is possible between the master station and the terminal. The properties of the connection are negotiated when establishing the connection. For example, one connection may have a constant data rate while other connections are "bursty"; in other words, sometimes there is a lot of communication but at other times there is little or none. The periods of time between bursts may be quite long.

For an exchange of messages between a terminal and a master station, it is necessary for the master station to know exactly when a terminal T1, T2, etc. is monitoring announcement channel AC to avoid unnecessary transmissions and also not to assume that the terminal is no longer participating in the communication process because it is no longer logging on. Possibilities here include either fixedly predetermined, i.e., stipulated periods of time or a report from the terminal when it is again monitoring announcement channel AC. In any case, however, master station ZE must be notified that the terminal is in a sleep mode, and the terminal must receive a confirmation that master station ZE has registered this fact.

Power consumption in a terminal is determined by the signal processing power, but in the case of a transmission it is also determined by the HF component. Signal processing occurs in the case of both transmission and reception, but the HF component has most of its power consumption in transmission. Most of the power consumption by the HF component occurs in the power amplifier/output amplifier. Not only does it consume a zero-signal current even when nothing is being transmitted, but also it must supply the required output power. Since the zero-signal current occurs even when there is nothing to send, it is obvious that the transmission amplifier should be switched off as often as possible. On the other hand, the transmission amplifier generally takes a relatively long period of time to be ready to run again, and therefore it can be turned off only when the expected period of time is long enough. This is also true of other parts of the system, e.g., scaling down or blanking out the clock pulse of digital hardware, oscillators in the HF part, etc. Therefore, the time a terminal needs to be ready to run again depends on which parts of the system have been turned off.

Figure 4:
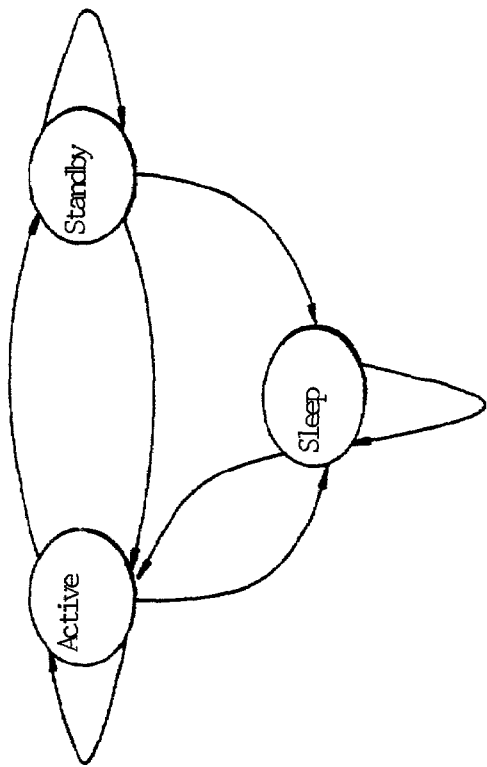
FIG. 4 shows a function state diagram for conserving power.

To this end, three states are defined according to the present invention, as illustrated in the function state diagram in FIG. 4. The active state means that a terminal is ready to participate in the communication process, i.e., it monitors any announcement sent out by master station ZE on announcement channel AC. The standby and sleep modes are different levels of inactivity which differ essentially in that more system components of the terminal are turned off in the sleep mode and the wake-up time is longer because reactivation of the individual components takes longer. Furthermore, the problem of synchronization is more critical in sleep mode because the intervals between announcements monitored on announcement channel AC are longer.

If the terminal is in active mode, and if the traffic parameters of the connections established allow it, it can notify master station ZE that it would now like to enter standby mode and it is monitoring one out of every nth announcements on announcement channel AC. After it has received confirmation from master station ZE, it goes into the standby mode. It remains in this state if it finds that there are no messages for it when monitoring announcement channel AC, and if it does not have any cells to transmit itself.

There are two reasons for changing to active mode:

1. Master station ZE notifies the terminal over announcement channel AC that it has one or more packets for the terminal and at the same time notifies it when they are to be received.

2. The terminal itself has one or more packets to send to master station ZE. In this case, the terminal accesses return channel RC and notifies the master station that it will go into active mode and that it has something to transmit. Master station ZE confirms the change in mode over announcement channel AC and notifies the terminal when it may transmit.

If the terminal has been in standby for a long period of time, and if the traffic characteristic of the connection allows, it may go into sleep mode. To do so, again there must be an exchange of messages with master station ZE, such that the terminal notifies master station ZE that it is monitoring every nth announcement on announcement channel AC, and a confirmation must be received from master station ZE. It is also possible for the terminal to go from active mode to sleep mode. Again in this case, there must be an exchange of messages between master station ZE and the terminal as described above. The mechanisms that apply are essentially the same as those in standby mode, i.e., the terminal monitors announcement channel AC at regular (longer) intervals and remains in sleep mode when there is nothing to receive (or to send).

The wake-up process, the transition to active mode, proceeds like the transition from standby mode. If the terminal itself has something to send, it activates the deactivated system components and accesses return channel RC. If master station ZE would like to send something to the terminal, it notifies the terminal of this in the announcement on announcement channel AC, which it knows the terminal is receiving. The terminal in sleep mode needs a longer amount of time for activation of the transmission branch in particular (the reception branch must be active to receive announcement channel AC), so it may be necessary to provide mechanisms for this purpose under some circumstances. One possible mechanism is the stipulation of a fixed wake-up time after which master station ZE allocates the terminal capacity in announcement channel AC. Another possibility is for the terminal to report back to master station ZE on return channel RC after wake-up.

In standby and sleep modes, it is important for a terminal and master station ZE to be synchronized very accurately, especially when the synchronization times are far apart. This will presumably not be the case in standby mode, but it is the case in sleep mode. In the case of a quartz clock accuracy of master station ZE and the terminals of 20 ppm each, for example, a maximum clock offset of 40 ppm may occur. In the case of a sleep time of 50 ms, this may mean an offset of up to 44 clock pulses for a system clock of 25 MHz, and more in the case of longer sleep times. Since reception synchronization must generally require clock precision, a great deal of effort is required for resynchronization, which under some circumstances may take several signaling periods. The method according to the present invention of overcoming this obstacle is explained below.

An important prerequisite for this method is that it consumes very little power itself, i.e., the signal processing outlay is low. Another prerequisite is that master station ZE regularly sets synchronization information, i.e., "marks" to orient a terminal. It is self-evident to set these marks at the beginning of a signaling period SP. The signaling period is constant while the content of the signaling period is variable.

One such mark is described in K. Brüninghaus, M. Radimirsch, "Coarse Frame Synchronization for OFDM based Wireless Communication Systems" PIMRC '98, Boston, USA, September 1998. This mark is very suitable for OFDM-based systems, but it can also be used with other modulation methods. Detection is preferably implemented by analog methods. One possibility may be power-saving limit amplifiers such as those used in DECT terminals. Other detection methods are also possible. What is important about this method is that detection of the frame symbol takes place independently of the remaining signal processing. Therefore, when the mark occurs, an event which can be used for synchronization is triggered.

The method according to K. Brüninghaus, M. Radimirsch, "Coarse Frame Synchronization for OFDM based Wireless Communication Systems" PIMRC '98, Boston, USA, September 1998 is not 100% reliable. With a low probability, on the one hand, a frame symbol can be detected when none has occurred, and on the other hand, a frame symbol may occur without being detected.

Figure 5:
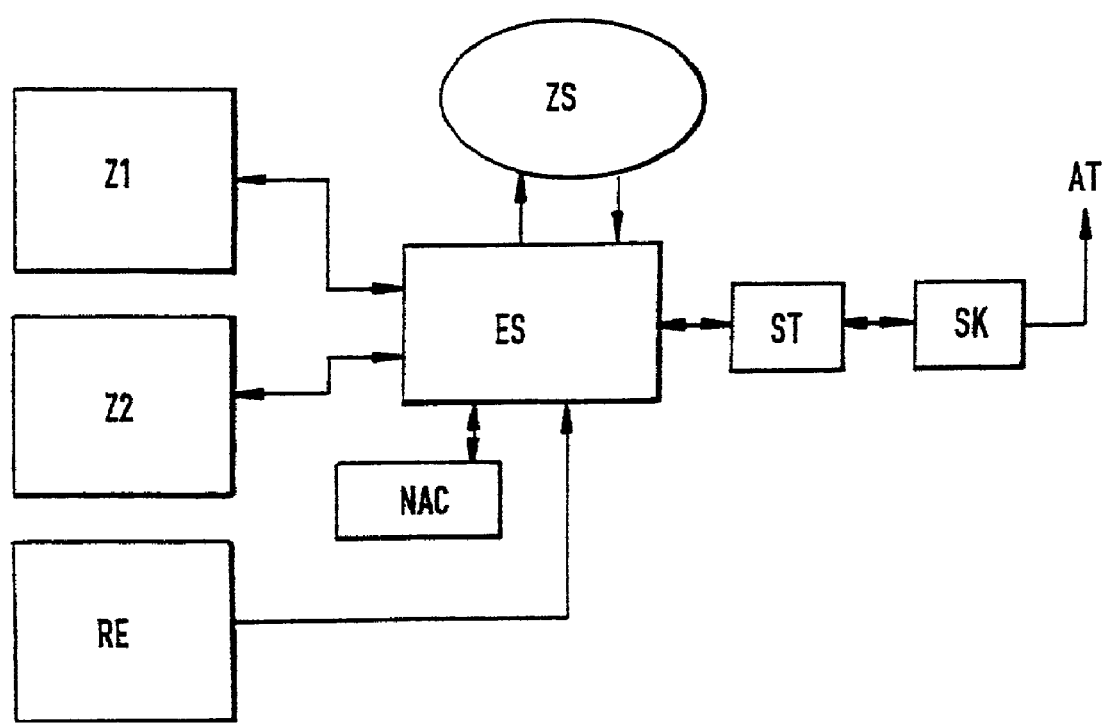
FIG. 5 shows a device for synchronization between the master station and the terminal.

These two types of errors are rare, but they can have a considerable influence on the counting process and result in errors. Therefore, measures must be taken to minimize these error sources. This may be done, for example, by using one or more separate timers in terminals which, together with the occurrence of the frame symbol, guarantee almost perfect reliability. The timers are sufficiently accurate over a period of several signaling periods. FIG. 5 shows one possible circuit for terminal T1. At the center there is a decision circuit ES which controls the entire synchronization. It is connected to frame recognition RE and two timers Z1 and Z2. It can set timers Z1 and Z2, and it receives a message after they have run out. The mechanism of decision circuit ES is a state machine, its state as well as the value of some variables being stored in state memory ZS and can be read out from state memory Z5.

A counter NAC is assigned to decision circuit ES. Decision circuit ES is connected to controller ST which is in turn connected to system components SK to which an antenna AT is connected. When terminal T1 goes into sleep mode, controller ST of terminal T1 transfers control to decision circuit ES according to FIG. 5, which in turn notifies controller ST of terminal T1 when it must monitor an announcement on announcement channel AC.

Figure 6:
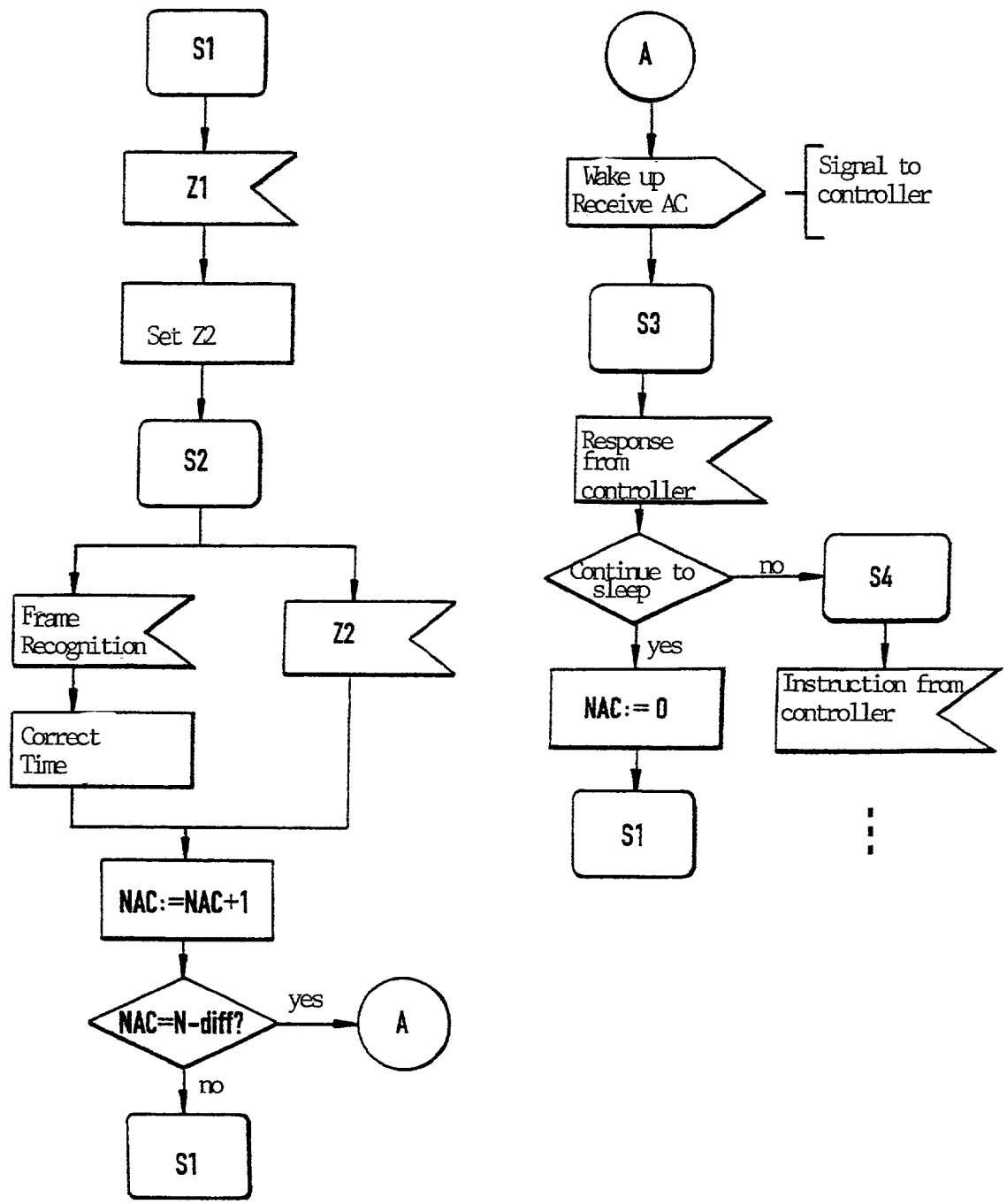
FIG. 6 shows a description of the automatic state machine of the decision circuit.

FIG. 6 shows the course of the function state diagram. The description language used is SDL (Standard Description Language). When terminal T1 is in sleep mode, it regularly waits for timer Z1 to run out in state S1. The signal from Z1 always arrives shortly before the signal of frame recognition RE is expected. Then decision circuit ES sets timer Z2 at a value shortly after the expected arrival of the frame signal and it then enters state S2. Due to this mechanism, a time window in which the frame symbol is expected is opened, and thus falsely detected frame symbols are suppressed.

In state S2, decision circuit ES awaits a signal either from frame recognition RE or from timer Z2. When the signal from frame recognition RE arrives, it is used to correct the time base of terminal T1. This correction relates the actual time of the frame signal to the expected time. A higher accuracy of this correction can be achieved by averaging over the occurrence of several frame symbols. If the frame signal is not detected because the detection of frame recognition RE is not absolutely reliable, then the signal of timer Z2 is analyzed and thus the clock pulse of timer Z2 is used as synchronization information. This ensures that each signaling period is counted.

Subsequently, counter NAC, which counts the occurrence of announcements in announcement channel AC, is incremented and a check is performed to determine if the count matches the value at which terminal T1 must monitor the corresponding announcement on announcement channel AC. A difference is introduced to ensure that the terminal will have enough time to activate the system components needed for the reception of announcement channel AC. If this value has not yet been reached, decision circuit ES goes back into state S1.

If this value has been reached, decision circuit ES delivers a signal to controller ST of terminal T1 with the instruction to receive said announcement on announcement channel AC and analyze it. If the analysis reveals that terminal T1 can continue in sleep mode, then counter NAC is reset for the occurrence of announcements, and terminal T1 goes into state S1. If it should not continue in sleep mode, decision circuit ES goes into state S4 and waits for the controller to give the instruction to go back to sleep mode. The other actions following S4 will not be explained in greater detail here.

Figure 7:
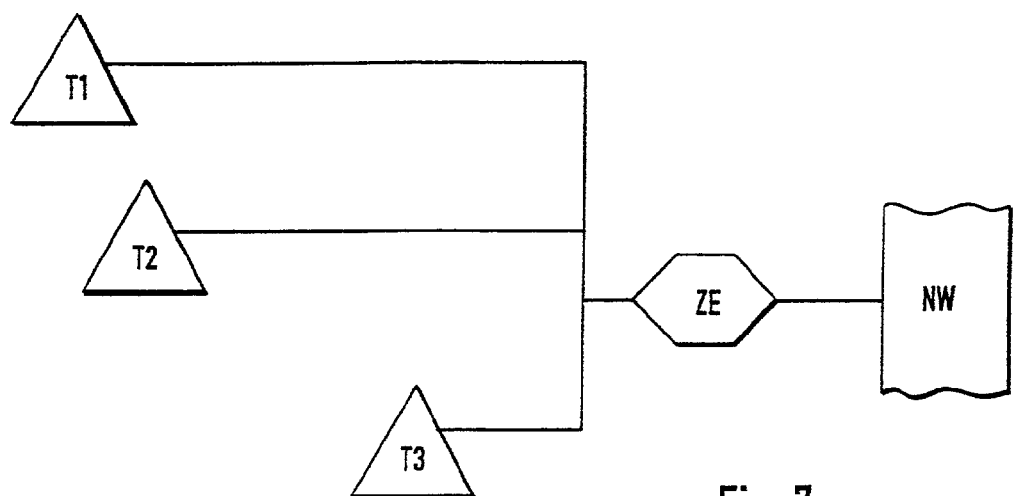
FIG. 7 shows the basic configuration of an embodiment having three terminals.

The basic configuration of the following embodiment is shown in FIG. 7. Terminals T1, T2 and T3 are associated with master station ZE and communicate with it over a common wireless channel, for example. Master station ZE is connected to a network NW in this case, although that need not necessarily be the case.

Figure 8:
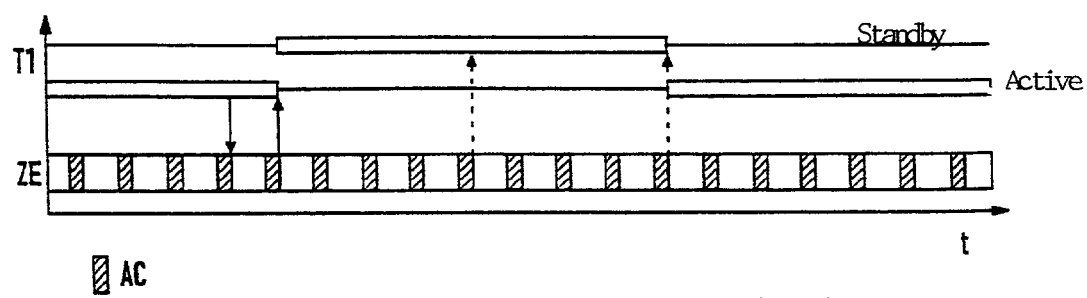
FIG. 8 shows the transitions between standby and active operating modes.

At first, all terminals are in active mode. After a while, terminal T1 decides that it would like to enter the standby mode and that it will monitor every fourth announcement on announcement channel AC and notifies master station ZE of this decision (see FIG. 8). Master station ZE returns the confirmation to terminal T1, and terminal T1 enters the standby mode. Then terminal T1 monitors every fourth announcement on announcement channel AC of master station ZE. On the second monitoring, terminal T1 receives the message that a message is to be received. Terminal T1 goes into the active mode and communicates normally with master station ZE.

Figure 9:
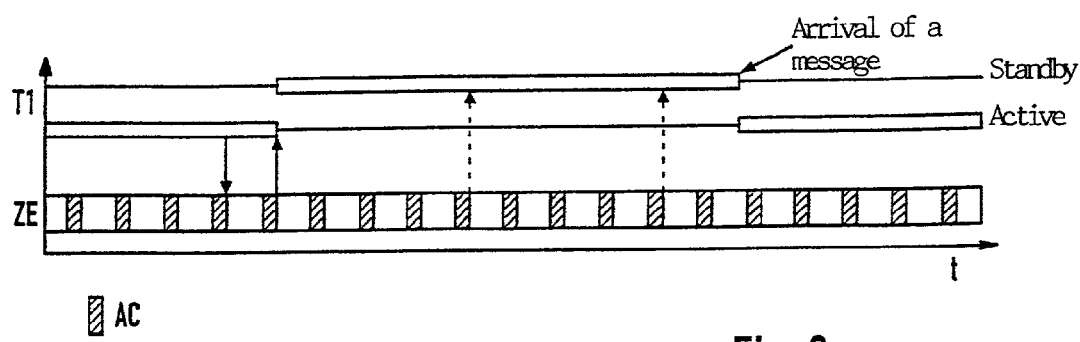
FIG. 9 shows the transitions between standby and active operating modes.

Terminal T1 then goes back into standby mode (see FIG. 9). This time, the transition back to active mode is triggered by a message that must be transmitted by terminal T1 to master station ZE.

Figure 10:
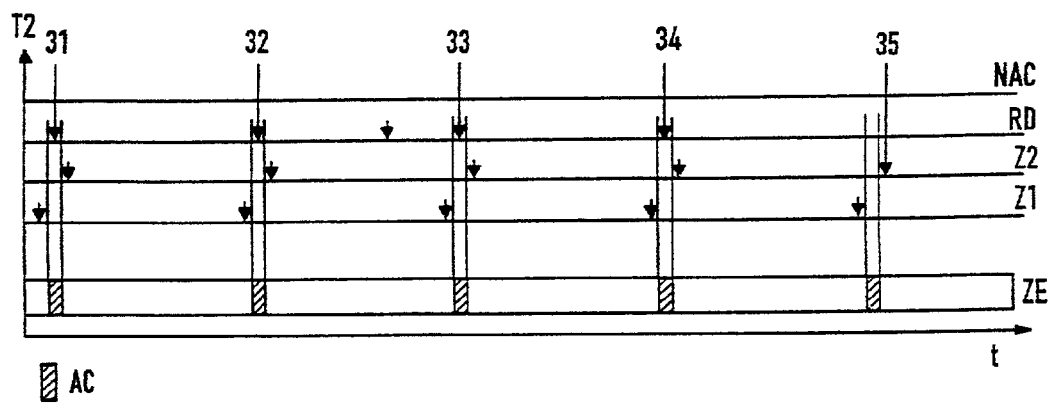
FIG. 10 shows a terminal in sleep mode.

Then terminal T2 decides to enter sleep mode and notifies master station ZE that it will now monitor one in every 50th announcement on announcement channel AC. The notification and confirmation take place as described previously, so that terminal T2 is then in sleep mode. FIG. 10 illustrates a detail of these processes, showing the transmission of master station ZE with the announcements on announcement channel AC at the bottom. The lines above that show the situation from the standpoint of decision circuit ES in the terminal, namely the results of frame detection and the timers. The instantaneous value of counter NAC for the announcements on announcement channel AC is shown at the top. Just before the occurrence of an announcement, timer Z1 starts up and opens a window within which the frame detection can be perceived and which is closed again by timer Z2. In the four cases presented first, incrementation of NAC by one is triggered by detection of the frame symbol. In the period when NAC=33, a frame symbol is erroneously detected, but this does not have any effect. The frame symbol is not detected in the transition from NAC=34 to NAC=35. Therefore, the increment is triggered by timer Z2.

Since it is possible for a terminal to miscount and therefore detect the wrong announcement on announcement channel AC, it is appropriate for master station ZE to send an announcement when it knows that this terminal is monitoring both when there is a message for this terminal, and if there are no packets waiting for this terminal. If there are no pockets waiting for this terminal, then the terminal is notified only that this was the correct announcement and that no messages are waiting. If the terminal discovers when monitoring announcement channel AC that it has miscounted, it must go briefly into active mode, log on with master station ZE (by accessing return channel RC) and resynchronize itself with master station ZE. Then it can go back into sleep mode.

To reduce the effects of miscounting, it is appropriate under some circumstances for the terminal in sleep mode to always monitor at least three or more successive announcements on announcement channel AC—e.g., the announcement which it believes it must monitor as well as the announcement before that one and the announcement after that one. If there is no notification of the terminal in any of the announcements, then it has miscounted and it must log on with the master station ZE to be resynchronized.

Additional alternatives are described below:

The frame symbol need not occur at the beginning of signaling period SP, as described previously, but instead it can be positioned anywhere in signaling period SP.

Detection of the start of the frame need not necessarily take place as before.

It is not absolutely necessary to count each announcement on announcement channel AC, because the divergence of the clock pulse in master station ZE and the terminal does not proceed very rapidly—if a terminal is in either standby or sleep mode and is to be awakened by master station ZE, it is also possible for this wake up to take place by sending a 1-bit information instead of by monitoring of announcement channel AC by the terminal. For example, this is possible with a mark similar to the mark used for counting signaling periods SP. It is essential here that this mark can also be detected easily and reliably. In addition, it is important for this second mark to differ from the first mark for counting signaling periods SP in form so that it cannot be confused in detection. If several terminals are to determine at this time whether they are to enter the active mode, then the occurrence of the second mark is interpreted as meaning that at least one of the terminals which is being affected at the moment is to wake up.

Other alternatives and embodiments of the method according to the present invention are described below.

Figure 11:
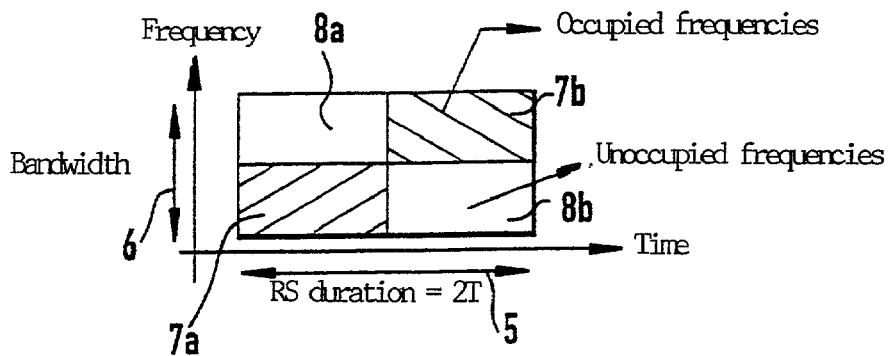
FIG. 11 shows a synchronization symbol.

It has previously been assumed that master station ZE waits until reaching the transmission frame to which the respective terminal listens to transmit data. This procedure either limits the sleep time or leads to long waiting times when master station ZE would like to transmit out of order. To prevent this, a signal that can be detected by a terminal at any time is described below. A special synchronization signal/frame symbol is used for this purpose; in addition to its synchronization function, it is also capable of sending a message—in particular a 1-bit information—to all terminals. As FIG. 11 shows, in a first half of time 5 for frame synchronization, one half of bandwidth 6 is occupied by a signal 7a and the other half of the bandwidth is occupied by no signal 8a. In a second half of time 5, the other half of bandwidth 6 is occupied with a signal 7b and the other half is occupied with no signal 8b. Such a frame synchronization signal can be detected by a simple analog circuit, including, for example, filters tuned to the respective bandwidth half, with a downstream weighting circuit. In comparison with digital signal processing, this saves a great deal of power because all or part of the device for digital signal processing can be turned off.

Figure 12:
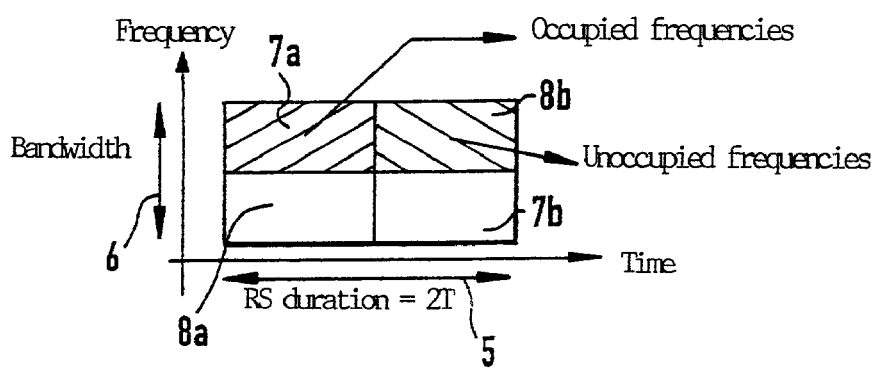
FIG. 12 shows a synchronization symbol with a wake-up function.

For transmission of information, this signal is simply inverted, as shown in FIG. 12. Each signal inversion of the synchronization information/frame symbol is used according to the present invention as a wake-up symbol, in particular for all terminals in sleep mode. This, however, may be important not only for all terminals in sleep mode, but also for other terminals. Recognition of the frame synchronization symbol functions properly even under worse transmission conditions (signal-to-noise ratio) than those necessary for demodulation of the data stream. In normal operation, the symbol shown in FIG. 11 is transmitted. For the case when master station ZE would like to send a message to one or more terminals, in particular those in the sleep mode, but master station ZE should not send a message to one or more terminals over the periodic active frames by the method described previously, another frame synchronization symbol is sent according to FIG. 12. It must be possible for all terminals to analyze both types of symbols by using suitable detection hardware in order to reliably guarantee normal synchronization as well as detection of the wake-up symbol. There is no change in the method described previously when the normal symbol occurs, but when any new wake-up symbol occurs, all the terminals go from sleep or standby mode into active mode and analyze one of the following frames to learn why they have been awakened.

In order for the master station to know when it can address the terminals after the wake-up symbol, the terminal must transmit at the time of the association, i.e., when the terminal logs on with master station ZE or when sleep mode is requested, after which period of time it is again in active mode. This period of time varies greatly depending on which components of the terminal are turned off.

Figure 13:
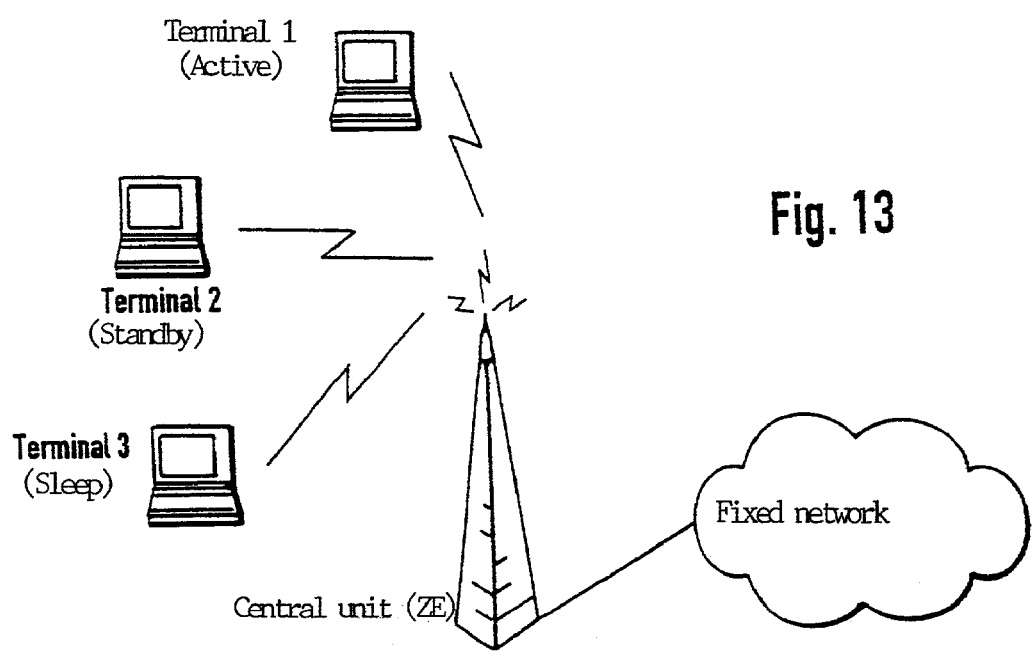
FIG. 13 shows a structure for exchange of wake-up messages.
Figure 14:
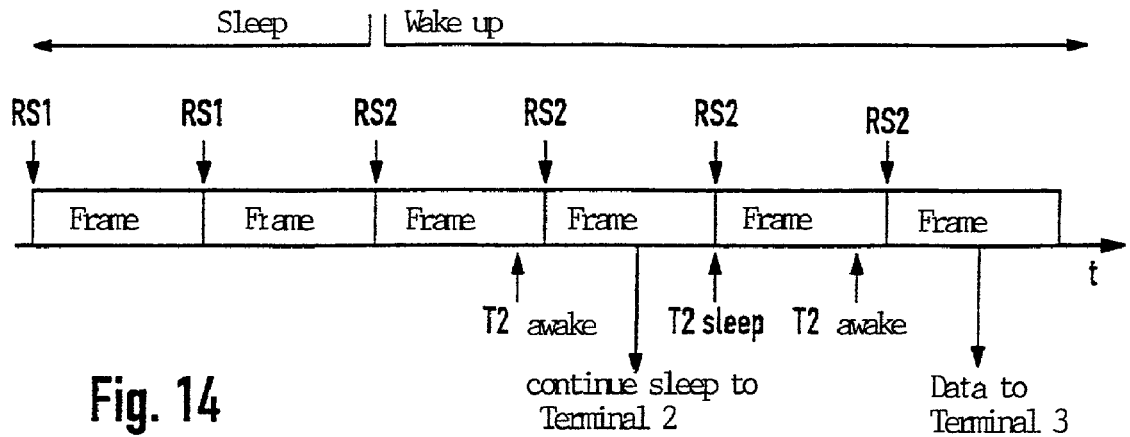
FIG. 14 shows a wake-up symbol sequence.

FIG. 13 shows another exemplary embodiment. Terminals T2 and T3 are in a power saving mode, while terminal T1 is active. If master station ZE now has a message for terminal T3 which cannot wait until this terminal is again monitoring a frame, then master station ZE sends a wake-up symbol as the synchronization symbol. Terminals T2 and T3 then go into the active mode. This process takes place more quickly in terminal T2 than in terminal T3, because more components were turned off in terminal T3 or the wake-up time is longer due to manufacturer-specific implementation. With longer sleep times, those components in particular which require a very long time to become active again are deactivated, so this time difference may be substantial. In order for master station ZE to know in which following frame it can send the information for terminal T3, it must first reveal which wake-up times, i.e., reactivation times, it needs. As soon as terminal T2 is ready to receive after the wake-up message, master station ZE sends a message that terminal T2 can go into the sleep mode again because the data affects only terminal T3. As soon as terminal T3 is ready and has also logged on, master station ZE sends the data to be transmitted. Terminal T3 is now in the active mode. If after a while, no more data need to be transmitted to or from the terminal, it can send a new sleep query to master station ZE. FIG. 14 shows the wake-up symbol sequence with different frame synchronization symbols RS1 and RS2. RS1 is the synchronization symbol according to FIG. 11 and RS2 is the synchronization symbol according to FIG. 12.

Figure 15:
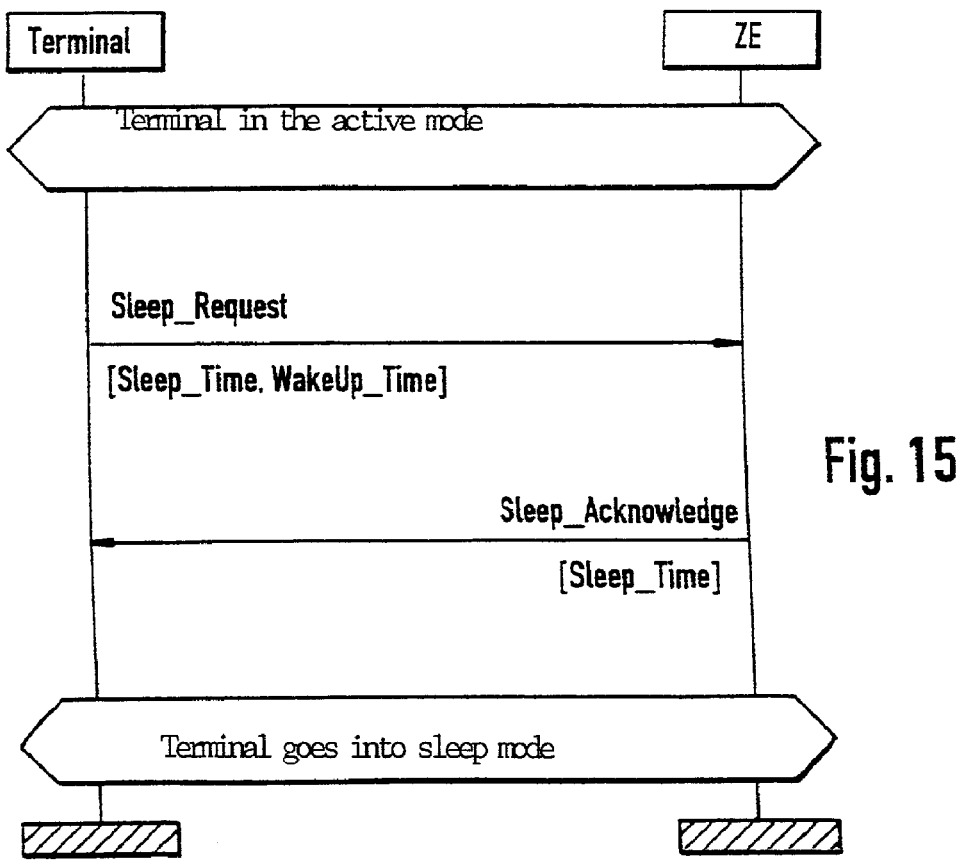
FIG. 15 shows the transfer of wake-up times.

It is simplest to transmit the wake-up times during the negotiation about the sleep phases (sleep request). This is illustrated in FIG. 15, where a terminal is labeled as "terminal." With a sleep request, a terminal also sends the time required to regenerate from this level of sleep (wake-up time). It is also possible to transmit the time required for waking up (wake-up time) during the association of the terminal. This is illustrated in FIG. 16. It is also possible to specify these wake-up times as system parameters as a function of the length of the sleep phases. Another possibility is not to transmit this length of the sleep phases, but instead to specify that a terminal has access over a random access channel as soon as it is ready. If the wake-up signal is basically the only method of waking up terminals from sleep mode, then it is not absolutely necessary to transmit the length of the sleep phases. In this case, a wake-up symbol is transmitted when there is data for a terminal. The terminal can in turn request transmission capacity over the random access channel (uplink signaling channel) (FIG. 14). It is advantageous not to send a wake-up symbol between frame symbols, but instead to alternate the two symbols. In other words, frame synchronization symbol RS1 is sent first according to FIG. 14, then there is a change to frame synchronization symbol RS2 until the next wake-up process is initiated again with frame synchronization symbol RS1. This has the advantage that even terminals that do not detect any frame synchronization symbol or make an erroneous detection also wake up.

Figure 18:
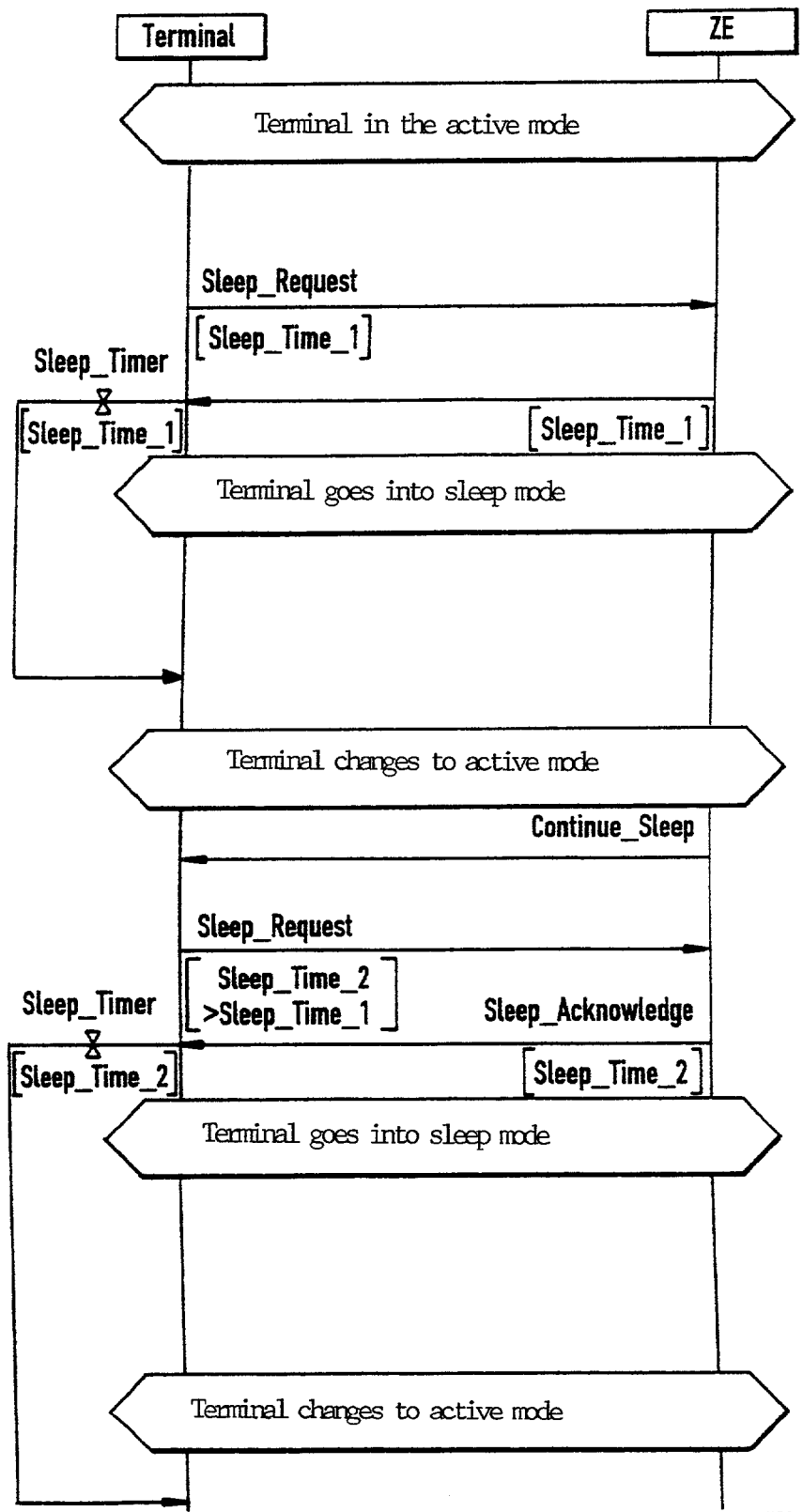
FIG. 18 shows a diagram for lengthening the sleep times.

So far three different operating modes have been discussed: active phase, standby phase and sleep phase. It is also possible, as shown in FIG. 17, to define only two operating modes, namely an active phase and a sleep phase which combines the standby and sleep phases. To do so, the time during which a terminal is in sleep until it monitors a broadcast channel again can be varied over time. It is thus possible to dynamically adapt the sleep phases to user behavior or to set them as a function of user specifications. Thus, a terminal can remain in sleep as long as it deems necessary on the basis of its instantaneous parameters. These parameters include primarily the parameters of the connections upheld by the terminal, such as the data rate, the maximum allowed delay or the arrival time interval between data packets. The user can increase the duration of sleep phases by manual configuration, in particular in favor of a longer battery lifetime, but this comes at the cost of greater delays in data transmission. A successive lengthening of the duration of the sleep phases is appropriate if the user behavior suggests that this is appropriate, in particular if the terminal is being used only sporadically, for example, or if it has not been used for a long time. As shown in FIG. 18, two sleep times are provided in particular for different sleep phases—sleep time 1 and sleep time 2. A terminal sends a new sleep request after master station ZE has confirmed the continuation of the sleep mode (continue sleep). A successive lengthening should also be understood to include the case when the sleep phases are at first reduced slightly to be increased subsequently even more, e.g., from a period of ten frames at first to nine frames and then to 30. In this connection, it is important that there is an increase in the sleep phases over time.

The battery status can be mentioned as a parameter that is set by the terminal itself and plays a role in determining the optimal sleep phases. A decline in battery capacity may determine longer sleep phases but therefore lower quality such as longer waiting times for transmission or in establishing a connection.

One example would be a terminal which has logged on with a master station ZE as in FIG. 13. A user using WWW applications in particular, such as Netscape or Internet Explorer, is working at this terminal. These applications have the property of generating an extremely bursty data stream, i.e., one that varies greatly. In addition, the behavior of the user has a great influence on the quantity of data to be transmitted: when a new website is loaded, a great deal of data is transmitted in a short period of time, but then no more data is transmitted for a long time while this website is being read. In these applications, unlike real-time applications such as speech or video, the maximum allowed delay can be set to be quite high. Therefore, this terminal may go into relatively long sleep phases relatively frequently between the activities of the user (clicking on a link). Then when this user leaves the terminal for a long period of time, the duration of the sleep phase may be increased gradually. As a result, more and more components of the terminal can be deactivated.

In this terminal, battery capacity is now reduced. Then the terminal increases the duration of sleep phases and thus lengthens function time at the expense of transmission quality. This may also occur when a user is using the terminal.

Another possibility is a combination of these methods. In other words, both the user behavior and the parameters of the active connections as well as the battery condition are included in the determination of the duration of the sleep phases.

Figures 19, 20:
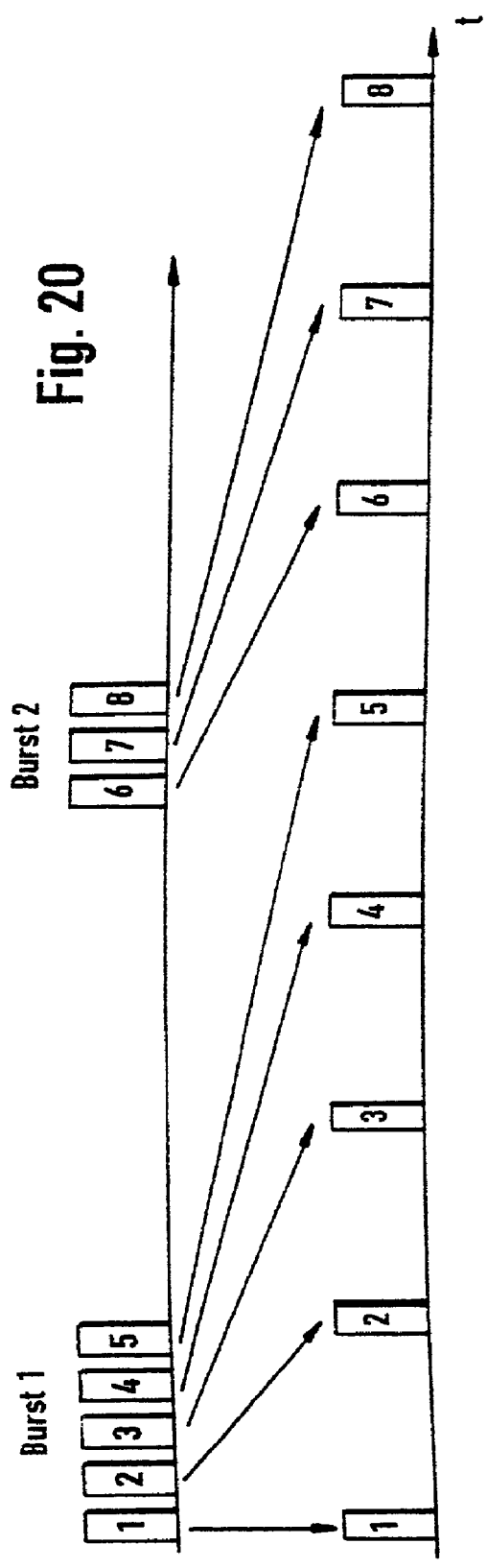
FIG. 19 shows the method utilized to conserve power in traffic at a constant data rate.
FIG. 20 shows a principle for smoothing burst operation.

There is also data traffic that is not bursty, i.e., fluctuating, as described above, but instead sends its data with great regularity, e.g., speech. This corresponds to service class CBR (constant bit rate) in ATM (asynchronous transfer mode). For the following description of implementations according to the present invention, the designation of this service class will be retained but without assuming any restriction to ATM applications. At a constant bit rate, both the terminal and master station ZE know the traffic parameters of the existing connection, so signaling is no longer necessary regularly here for power saving operation. A terminal T1 transmits only once the fact that it sleeps between transmissions and therefore is not available for an unscheduled transmission during this time. Terminal T1 knows the frame in which the next transmission will occur (see FIG. 19). Terminal T1 goes into the sleep mode without signaling. With other types of traffic, terminal T1 must be wakened first. As shown in FIG. 19, terminal T1 goes into the active mode promptly before a frame in which a transmission takes place—in frames 1, 4 and 7 in FIG. 18—in order to receive the data and then it goes to sleep again. Since the latter method greatly reduces the required signaling resources, it may also be useful, if allowed by the traffic parameters, to smooth non-CBR traffic, i.e., to distribute a burst (a large quantity of data occurring in a short time) over time. This is shown in FIG. 20. This makes it possible to also use this method with reduced signaling resources for other service classes such as VBR and ABR. Here again, the use of ATM is not obligatory.

In a scenario like that described in conjunction with FIG. 13, where a plurality of terminals are connected to one master station ZE, not necessarily in the sleep mode now, it is advantageous to have a possibility of dividing the terminals into different categories.

The method already used for saving power is also used for this purpose. However, a sleep confirmation is sent from master station ZE to only those terminals that are combined. In this message, master station ZE gives notice that a terminal should monitor the one transmission frame out of how many frames. This permits a division of the available data rate among several terminals.

In addition, a terminal having a slightly modified sleep arrangement can give notice that it will monitor only every n-th frame. This reduces the service quality for this terminal, but it is then possible to offer access to this terminal under more favorable conditions. Power consumption by the terminal is also reduced due to the frequent sleep times. One embodiment would be a scenario like that described in conjunction with FIG. 13 having a plurality of IP (Internet Protocol) terminals. These have the property of not demanding or supporting any service quality. IP in the conventional version at the present time supports only "best effort," i.e., the best possible transmission. These terminals thus attempt to send data as rapidly as possible. Bandwidth is greatly limited with wireless systems, so these terminals can be divided into clusters each of which has access to the wireless channel in only one of the N frames, e.g., terminal 1 in frame 1, terminal 2 in frame 2, . . . The resulting traffic is thus greatly smoothed and the total throughput is increased.

What is claimed is:

1. A method for performing a power saving operation for communication terminals in a communication system corresponding to a wireless system providing a packet switching with a master station that may be a communication terminal, that sends out messages for the communication terminals in a frame-structured announcement channel, and that receives messages from the communication terminal in a return channel, the method comprising the steps of:
   allocating to the communication terminals at least a first operating mode and a second operating mode, the first operating mode defining an active phase, each one of the communication terminals placed in the active phase monitoring each announcement on the announcement channel, and the second operating mode defining a sleep phase in which the announcement channel is monitored only at intervals;
   causing the master station to send synchronization information including at least one frame symbol in order to synchronize the communication terminals;
   causing the communication terminals to analyze the synchronization information including the at least one frame symbol at least in intervals in the first operating mode, the synchronization information correcting respective time bases of the communication terminals; and
   causing the communication terminals to analyze the synchronization information in at least the second operating mode;
   wherein:
   a third operating mode defines a standby phase in which the announcement channel is periodically monitored in previously defined time windows and at least one system component of one of the communication terminals is deactivated, and the announcement channel is monitored more frequently in the third operating mode than in the second operating mode, and
   in the second operating mode at least one more system component is deactivated, and
   a reactivation time in the second operating mode is longer than a reactivation time in the third operating mode.

2. The method of claim 1, wherein each communication terminal set to go into one of the second operating mode and the third operating mode sends a corresponding message to the master station and notifies the master station when the communication terminal sending the corresponding message will log on next.

3. The method of claim 2, wherein one of a transition from the first operating mode to one of the second operating mode and the third operating mode and a transition from the third operating mode to the second operating mode is implemented only when a confirmation is received from the master station.

4. The method of claim 1, wherein a period of time for which one of the communication terminals goes into one of the second operating mode and the third operating mode is negotiated between the master station and the one of the communication terminals as a function of traffic parameters of connections.

5. The method of claim 1 wherein times in which the communication terminals monitor the announcement channel are one of:
   defined by the master station in a fixed manner, and
   reported by the communication terminals to the master station and confirmed by the master station.

6. The method of claim 1, wherein:
   a transition from one of the second operating mode and the third operating mode to the first operating mode is performed only when the master station has notified a corresponding one of the communication terminals that the master station has data packets for the corresponding one of the communication terminals, and
   during the transition, the master station also notifies the corresponding one of the communication terminals when the data packets are to be received.

7. The method of claim 1, wherein:
   a transition from one of the second operating mode and the third operating mode to the first operating mode is performed only when one of the communication terminals is to send at least one data packet to the master station,
   during the transition, the one of the communication terminals accesses the return channel and notifies the master station that the one of the communication terminals is to enter into the first operating mode and that the one of the communication terminals has something to transmit, and
   during the transition, the master station confirms a change to the first operating mode in the announcement channel and notifies the one of the communication terminals when the one of the communication terminals may transmit.

8. The method of claim 1, wherein a transition from the third operating mode to the second operating mode is performed when one of the communication terminals has been in the third operating mode for a long time and a permissible traffic characteristic exists,
   the one of the communication terminals notifies the master station at which intervals the one of the communication terminals is monitoring the announcement channel, and
   the transition occurs only after confirmation by the master station.

9. The method of claim 1, wherein:
   a fixed wake-up time is stipulated for a transition from the second operating mode to the first operating mode,
   after the fixed wake-up time, one of the following is performed:
      the master station allocates a capacity in the announcement channel to a corresponding one of the communication terminals, and
      the corresponding one of the communication terminals sends a return message to the master station in the return channel after wake up.

10. The method of claim 1, wherein the at least one frame symbol is sent at a start of a frame and is detected independently of a remaining signal processing.

11. The method of claim 1, wherein a transition from one of the second operating mode and the third operating mode to the first operating mode is performed by sending a mark like the announcement channel, the mark differing in form from another mark belonging to the announcement channel.

12. The method of claim 11, wherein the mark includes 1-bit information.

13. The method of claim 1, further comprising the step of:
causing the synchronization information including the at least one frame symbol to send messages to the communication terminals in at least one of the second operating mode and the third operating mode.

14. The method of claim 13, wherein the messages include 1-bit information.

15. The method of claim 13, further comprising the step of:
inverting the synchronization information including the at least one frame symbol for transmission of messages.

16. The method of claim 2, wherein:
messages in the synchronization information including the at least one frame symbol include wake-up symbols for each communication terminal in at least one of the second operating mode and the third operating mode, and
a signal inversion is performed for each new wake-up process.

17. The method of claim 1, further comprising a performance of one of the steps of:
reporting times during which one of the communication terminals is to remain in one of the second operating mode and the third operating mode are reported to the master station; and
stipulating that the one of the communication terminals can access a random access channel as soon as the one of the communication terminals is ready for operation.

18. The method of claim 1, wherein wake-up times correspond to times needed by one of the communication terminals for a transition to the active phase, and the wake-up times are reported to the master station during one of a negotiation of the sleep phase and an association of the one of the communication terminals.

19. The method of claim 1, wherein wake-up times correspond to times needed by one of the communication terminals for a transition to the active phase and are defined as system parameters as a function of the sleep phase.

20. The method of claim 1, further comprising the steps of:
suppressing a transmission of a duration of the sleep phase when certain ones of the communication terminals are reactivated exclusively by corresponding wake-up symbols; and
sending the corresponding wake-up symbols when data is present for one of the communication terminals.

21. The method of claim 1, further comprising the steps of:
dynamically adapting a duration of the sleep phase to a user behavior; and
adjusting the duration as a function of user stipulations.

22. The method of claim 21, further comprising the step of:
lengthening the sleep phase successively when one of the communication terminals is one of used only sporadically and has not been used for a long time, a lengthening being defined as the sleep phase having an overall increase over time.

23. The method of claim 21, further comprising the step of:
lengthening the sleep phase in favor of a longer battery lifetime of the communication terminals.

24. The method of claim 1, wherein
a transition to the sleep phase takes place without signaling in an operation having an approximately constant data rate, and
a transition to the active phase takes place without a prior analysis of a wake-up symbol.

25. The method of claim 1, further comprising the step of:
distributing bursty data traffic over time to reduce signaling resources needed.

26. The method of claim 1, further comprising the steps of:
dividing the communication terminals into different categories; and
causing the master station to inform the communication terminals belonging to one of the different categories to monitor one transmission frame out of a number of transmission frames.

27. The method of claim 1, further comprising the steps of:
dividing the communication terminals into different categories; and
causing the master station to allocate different service qualities as a function of the different categories.

28. An arrangement for performing a power saving operation of a communication terminal for a wireless communication system having packet switching, the arrangement comprising:
a decision circuit by which a synchronization of the terminal can be controlled with respect to synchronization information including frame symbols received from a master station, the decision circuit assuming a control of the terminal from an actual controller of the terminal when the terminal goes from an active first operating mode into another operating mode corresponding to one of a second operating mode including a standby mode and a third operating mode including a sleep mode, wherein the terminal analyzes synchronization information during at least one of the second and third operating modes;
a timer device capable of being controlled by the decision circuit and for opening a time window for receiving the synchronization including the frame symbols when the synchronization information including the frame symbols is expected, the received synchronization information being useable to correct a time base of the terminal; and
a counter for counting an occurrence of announcements on an announcement channel to which the terminal has access and, depending on a count of the announcements, for checking whether the terminal must monitor the announcement channel and must activate system components required to monitor the announcement channel;
wherein in the second operating mode the announcement channel is periodically monitored in previously defined time windows and at least one system component of one of the communication terminals is deactivated, and the announcement channel is monitored more frequently in the second operating mode than in the third operating mode, and in the third operating mode at least one more system component is deactivated, and a reactivation time in the third operating mode is longer than a reactivation time in the second operating mode.

29. The arrangement of claim 28, wherein:
the counter can be reset, if the counted announcements do not match a predetermined counter reading, the counter allowing the terminal to remain in one of the second operating mode and the third operating mode, and if the counted announcements match the predetermined counter reading, a control signal can be transmitted from the decision circuit to the actual controller of the terminal to cause the system components to be activatable for receiving further announcements on the announcement channel and to cause the further announcements to be analyzable.

30. The arrangement of claim 28, wherein a clock rate of the timer device can be analyzed for synchronization purposes if there has been no detection of the synchronization information including the frame symbols.

31. The arrangement of claim 28, wherein more than one received instances of synchronization information including the frame symbols are averaged to produce an average over time for correcting the time base of the terminal, a correction for the time base of the terminal being processed from the average.

32. The arrangement of claim 28, further comprising:

a plurality of detection devices for normal instances of the synchronization information including the frame symbols and for inverted instances of the synchronization information including the frame symbol.

* * * * *